Patented July 10, 1928.

1,676,331

UNITED STATES PATENT OFFICE.

LUDWIG HOCHSTEIN, OF WANDSBEK, GERMANY, ASSIGNOR TO E. T. BROWN, OF THOMASTON, MAINE.

HEAT RESISTANT BOROSILICATE GLASS.

No Drawing. Application filed April 10, 1925, Serial No. 22,196, and in Germany March 15, 1925.

Heretofore it has been proposed to manufacture different kinds of glass which possess, to some degree, adaptability to resist alkalies and acids, and sudden changes in temperature but all such glasses, so far as I am aware, include either an alkali or an alkaline earth oxide.

Clear quartz glass having 100% silica possesses the greatest resistivity and also the lowest coefficient of expansion but as this quartz glass is expensive to make and very difficult to melt and, therefore, cannot be used for ordinary purposes, the usual practice has been to produce a glass by suitable mixtures in an effort to approach clear quartz glass in characteristics.

Clear quartz glass having a very low coefficient of expansion and being resistible to acids and alkalies, the tendency has been to employ in addition to silica, substances which combine a low coefficient of expansion with resistivity to acids and alkalies. For instance, boron-oxide or boron-trioxide has been proposed but, as heretofore constituted, with no great success as such a glass is subject to weather conditions, will become dull in appearance, is subject to attack by alkalies and to disintegration; hence, is not suited for use in the open, nor for cooking utensils, or laboratory appliances. Also, lithium in small quantity has been proposed but while it gives the glass a slight additional resistivity, and low coefficient of expansion, nevertheless because it is an alkali, it lowers the quality of the glass, especially against chemicals influences and, also, lowers the melting point of the glass.

Other proposals have been to add antimony and soda for the purpose of obtaining a low coefficient of expansion but the resulting glass has not been satisfactory.

My invention differs radically from all earlier glasses of which I have knowledge, in that the improved glass I have produced embodies neither an alkali nor an alkaline earth oxide.

My invention has for its object the provision of a glass which will approach closely to pure quartz glass as to low coefficient of expansion but possessing a relatively high percentage content of silica, and adaptability to resist alkalies and acids almost equal to that of clear quartz glass, thereby obtaining practically all the advantages of pure quartz glass without, however, being subject to the high cost of production of clear quartz glass and with the added advantage of being workable in an ordinary furnace.

Heretofore no glass has been made possessing a content of more than 80% of silica but even with such high content these earlier glasses have not been readily workable.

My improved glass has a minimum silica content of 80% and a maximum content of 90%, varying according to the purpose for which the glass is to be used.

Glasses having as high a percentage of silica as 80% must rely on large percentages of alkalies and other matter affording fusibility if 80% silica is to be attained. But all alkalies, barium oxide, lime, etc. which, for practical purposes, are added to cause fusibility, impair the quality of the glass because they render it more fluid, though heightening the coefficient of expansion and thus impair the resistance of the glass to chemical and thermic influences.

My improved glass has no such disadvantages since it contains no matter injurious to the quality of the glass and yet may have as high as 90% silica and be produced at very low cost in an ordinary furnace.

I have demonstrated my practical uses that the glass constituting the present invention when used in cooking utensils can be exposed to temperatures up to 500° C. and then instantly cooled without injury. Furthermore, my new glass may be heated up to 900° C. or 1000° C. without becoming soft, that is, it may be heated dry up to these temperatures, thus adapting it for use in high-power electric lamps, X-ray lamps, and scientific apparatus. It is also adapted for use in making containers, vessels, etc. such as used by chemists, in lieu of containers of silver, platinum, copper, etc. for the treatment of acids, whether the temperatures be low or high.

In fact, my improved glass is adapted for use as the material for making any apparatus, machine, appliance, or container, or conduit where it becomes necessary to encounter high temperatures, sudden cooling, resist the action of acids or alkalies, and withstand shocks, etc. without breakage.

The glass can be cast, pressed, blown, drawn, rolled, welded, or worked in any manner or by any method known at the present day. It may be colored in the purest shades without affecting its qualities.

Glass made in accordance with the present invention contains silica, $SiO_2$; boron trioxide, $B_2O_3$, (or, boron oxide); aluminum oxide, $Al_2O_3$; and zirconium oxide, $ZrO_2$ of which the following tables are examples:—

*Table of the various kinds of glass.*

|  | A | B | C | D | E |
|---|---|---|---|---|---|
| $SiO_2$ | 80 | 82.5 | 85 | 87.5 | 90 |
| $B_2O_3$ | 17 | 15 | 13 | 11 | 9 |
| $Al_2O_3$ | 1.5 | 1.25 | 1.0 | 0.75 | 0.50 |
| $ZrO_2$ | 1.5 | 1.25 | 1.0 | 0.75 | 0.50 |
|  | 100.0 | 100.0 | 100.0 | 100.0 | 100.0 |

*Molecular proportion.*

|  | A | B | C | D | E |
|---|---|---|---|---|---|
| $SiO_2$ | 0.133 | 1.375 | 1.417 | 1.458 | 1.5 |
| $B_2O_3$ | 0.243 | 0.214 | 0.186 | 0.157 | 0.129 |
| $Al_2O_3$ | 0.105 | 0.012 | 0.010 | 0.007 | 0.005 |
| $ZrO_2$ | 0.012 | 0.010 | 0.008 | 0.006 | 0.004 |

*Linear expansion—(coefficient).*

A. 0.0000025.
B. 0.0000025.
C. 0.0000025.
D. 0.0000025.
E. 0.0000025.

*Tensile strength.*

A. 8.455 kg. per sq. mm.
B. 8.525 kg. per sq. mm.
C. 8.595 kg. per sq. mm.
D. 8.665 kg. per sq. mm.
E. 8.735 kg. per sq. mm.

*Pressure.*

A. 116.70 kg. p. sq. mm.
B. 117.47 kg. p. sq. mm.
C. 118.25 kg. p. sq. mm.
D. 119.02 kg. p. sq. mm.
E. 119.80 kg. p. sq. mm.

*Elasticity (coefficient).*

A. 7070 kg. p. sq. mm.
B. 7050 kg. p. sq. mm.
C. 7030 kg. p. sq. mm.
D. 7010 kg. p. sq. mm.
E. 6990 kg. p. sq. mm.

*Specific weight or density*

A. 2.24 g. p. cbcm.
B. 2.25 g. p. cbcm.
C. 2.26 g. p. cbcm.
D. 2.26 g. p. cbcm.
E. 2.27 g. p. cbcm.

*Specific heat.*

A. 0.1996 g-kal. degrees C.
B. 0.1986 g-kal. degrees C.
C. 0.1976 g-kal. degrees C.
D. 0.1965 g-kal. degrees C.
E. 0.1957 g-kal. degrees C.

The linear coefficient of expansion for all of these five kinds of glass is always the same, namely 0.0000025, calculated according to Winkelmann and Schott. This evenly remaining coefficient of expansion of all the kinds of glass is an important point of the invention. In view of the fact that the formula for computation of the expansion is an empirical one, according to Winkelmann and Schott, and only applies in a certain sense for kinds of glass containing considerably less of silica, (about a quantity of from 50% to 60%), I ascertained, that with these kinds of glass containing much silica and an accordingly reduced quantity of boron-trioxide, the expansion of these kinds of glass in reality is 30% under the values which result from calculations by Winkelmann and Schott.

The real coefficient of expansion of my glass which amounts to about 0.0000017, is therefore almost equal to that of the clear quartz-glass. That the expansion of the various vitrified silica kinds of glass in this invention remains always alike is caused in so far, that the percentage added of aluminumoxide and zirkonium oxide is the equal for both oxides with all five kinds of glass.

I have called attention only to five kinds of glass but it will be understood that the invention comprehends all kinds of glass falling within the ranges of percentages set forth in the foregoing tables.

It is to be noted that all examples of my glass contain beside silica and boron-trioxide really only one additional substance because the percentage of aluminumoxid and zirconiumoxid is always alike for each sort of glass. Therefore, aluminumoxid and zirconiumoxid can be kept ready in form of a mixture for all various kinds of glass, and only this ready compound remains to be added then to silica and boron-trioxide. All mixtures of these various sorts of glass can be molten in the ordinary furnace. This is of great importance with this invention. The dual factor, aluminumoxid and zirconium oxid provides for the glass of this invention such resistivity against acids and alkalies that the character of clear quartz-glass (vitrified silica) has been very nearly reached. Even at high temperatures, acids and alkalies will not attack these sorts of glass exactly as this is not the case with clear quartz-glass.

Due to the easy and simple production of the mixtures and the easy fusibility in the ordinary furnace, the various kinds of glass of this invention are especially adapted for production on a large scale. One obtains a low-priced, highly resistible glass, which possesses the character of the clear quartz-glass. These sorts of glass made according to this invention can be easily molten, blown, welded, pressed, pulled, rolled, in short, can be worked just like any other glass.

The joint factor aluminum oxid and zirconium oxid is just what causes the temperature of melting to remain normal for glass of this kind.

It is further known, that the amount of thermal resistivity plays an important part with highly resistible glass as it pictures the inner value of the glass compared with other kinds. This one calculates generally after the empirical formula by Winkelmann and Schott, which is:

$$F = \frac{P}{a.E}\sqrt{\frac{k}{s.c}}$$

meaning:
F coefficient of thermal resistivity.
P tensile strength.
a linear expansion.
E elasticity.
k heat conductivity.
s specific weight or density.
c specific heat of the glass.

Following this formula, the glass of table A of this invention has a thermal resistivity F of 37.6 and therefore an extraordinary value.

On account of the extraordinary characters of these kinds of glass there is brought about the result that they will stand high temperatures and sudden cooling up to 500° C., and further that the softening temperature of such glass lies between 900° and 1050° C.

Consequently it is possible to weld thick glass produced according to this invention at exceptional high temperatures, which has heretofore never been possible with any kind of glass.

Glass produced according to this invention is suitable for all laboratory-utensils, for chemical apparatus used for boiling water, oil, acids and alkalies, in home-use for cooking and baking-dishes of every kind and size, for electrical high tension insulators, for electrical heating apparatus and for bodies formed by welding. With its unusual character it can be used everywhere that expensive clear quartz-glass has had to be used.

Furthermore, all glass produced according to this invention can be dyed with the known coloring-matter in every color without losing any of its advantages.

Glass made by this invention can therefore be produced colorless, transparent and also in every color.

What I claim, is:

1. A glass composed of silica, boron oxide, alumina, and zirconia and having a low coefficient of expansion.

2. A glass composed of silica, boron oxide, alumina, and zirconia, whose coefficient of expansion is approximately 0.0000017.

3. A glass composed of silica, boron oxide, alumina, and zirconia, wherein the amount of silica content is at least as great as approximately 80%.

4. An acid glass which is composed of silica, boron-trioxide, aluminum oxid, and zirconium oxid, wherein the aluminum oxid and zirconium oxid are in equal quantities, the glass having a linear coefficient of expansion of approximately 0.0000017.

5. An acid glass which is composed of silica, boron-trioxide, aluminum oxid, and zirconium oxid, wherein the aluminum oxid and zirconium oxid are in equal quantities, and the quantity of boron-trioxide, aluminum oxid, and zirconium oxid is proportioned to the quantity of silica in a decreasing amount as the proportion of silica is increased.

6. An acid glass which is composed of silica, boron-trioxide, aluminum oxid, and zorconium oxid, wherein the aluminum oxid and zirconium oxid are in equal quantities, with an approximate minimum of 80% of silica, and an approximate maximum of 15% of boron-trioxide, 1.50% of aluminum oxid, and 1.50% of zirconium oxid, the glass having a linear coefficient of expansion of approximately 0.0000017.

7. An acid glass which is composed of silica, boron-trioxide, aluminum oxid, and zirconium oxid, wherein the aluminum oxid and zirconium oxid are in equal quantities, the approximate maximum quantity of silica is 90%, and the approximate minimums of boron-trioxide is 7%, that of aluminum oxid is .50%, and that of zirconium oxid is .50%, the glass having a linear coefficient of expansion of approximately 0.0000017.

8. An acid glass which is composed of silica, boron-trioxide, aluminum oxid, and zirconium oxid, wherein the aluminum oxid and zirconium oxid are in equal quantities, and the silica varies in quantity between an approximate minimum of 80% and an approximate maximum of 90%, and the boron-trioxide varies in quantity between an approximate maximum of 15% and an approximate minimum of 7%, the glass having a linear coefficient of expansion of approximately 0.0000017.

9. An acid glass which is composed of silica, boron-trioxide, aluminum oxid, and zirconium oxid, wherein the aluminum oxid and zirconium oxid are in equal quantities, the glass having a coefficient of expansion of approximately 0.0000017 and a thermal resistivity of approximately 37.6.

10. A weldable acid glass which is composed of silica, boron-trioxide, aluminum oxid, and zirconium oxid, wherein the aluminum oxid and zirconium oxid are in equal quantities, the glass having a thermal resistivity of approximately 37.6.

In testimony whereof I affix my signature.

LUDWIG HOCHSTEIN.